UNITED STATES PATENT OFFICE.

ALFRED F. FOSTER, OF ST. LOUIS, MISSOURI.

IMPROVEMENT IN COMPOUNDS FOR FIRE-BRICK.

Specification forming part of Letters Patent No. 150,854, dated May 12, 1874; application filed April 20, 1874.

*To all whom it may concern:*

Be it known that I, ALFRED F. FOSTER, of the city and county of St. Louis, State of Missouri, have invented a certain Improvement in Fire-Brick, of which the following is a specification:

My invention consists in the use of ground or crushed sandstone mixed with soft clay as a substitute for the ground burnt clay now used with the soft clay, for the purpose of giving to the brick greater firmness and power to resist fire.

The sandstone is ground or crushed in any suitable mill, and then sifted through a sieve having about nine meshes to the inch. The sieves may be either coarser or finer, if desired. That portion of the sandstone which passes through the sieve is mixed with the clay of which the brick is to be formed, in such proportions as the quality of the brick may require. The fine sand may be used for molding purposes.

For the best brick, I prefer about three parts of sandstone to one of clay. For the common brick, I use about five parts of clay to one of sandstone. These proportions may be varied not only within the extremes mentioned, but beyond them.

If the proportion of sandstone is made unduly large, the brick becomes brittle; if unduly small, the brick loses its power to resist fire. The sandstone commonly used by me for this purpose contains about seventy-nine per cent. of silica; but other grades of sandstone may be used.

Bricks made as herein described are, in many respects, superior to bricks made in the ordinary way. They are firmer, more durable, have greater power to resist fire, and are made at less expense than those in which the burnt clay or brick-dust is used. The sandstone may be used in precisely the same way in the manufacture of tiles, gas-retorts, zinc-retorts, glass-pots, crucibles, and other wares that have been or may be constructed of fire-clay.

What I claim as my invention, and ask to have secured to me by Letters Patent, is—

The composition of ground sandstone with clay, as and for the purposes hereinbefore described.

ALFRED F. FOSTER.

Witnesses:
   ROBT. H. PARKINSON,
   LEONARD WILCOX.